(12) United States Patent
Hasegawa et al.

(10) Patent No.: US 6,705,631 B2
(45) Date of Patent: Mar. 16, 2004

(54) STEERING DAMPER SYSTEM FOR VEHICLES

(75) Inventors: Yosuke Hasegawa, Saitama (JP); Takeyasu Itabashi, Saitama (JP); Kanji Hayashi, Saitama (JP); Takeshi Wakabayashi, Saitama (JP); Osamu Bunya, Saitama (JP); Tomoyuki Harada, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/127,544

(22) Filed: Apr. 23, 2002

(65) Prior Publication Data

US 2002/0175489 A1 Nov. 28, 2002

(30) Foreign Application Priority Data

May 25, 2001 (JP) ........................................ 2001-157068

(51) Int. Cl.⁷ .................................................. F16F 9/00
(52) U.S. Cl. ........................ 280/272; 180/219; 188/306
(58) Field of Search ................................ 280/272, 271, 280/276, 279, 280; 180/219; 188/306, 302, 310; 74/551.1

(56) References Cited

U.S. PATENT DOCUMENTS

| | | | |
|---|---|---|---|
| 4,773,514 A | | 9/1988 | Gustafsson |
| 4,811,807 A | * | 3/1989 | Schier ........................ 180/141 |
| 5,492,033 A | * | 2/1996 | Hopey ........................ 74/551.1 |
| 5,516,133 A | * | 5/1996 | Motrenec et al. ........... 280/272 |
| 5,797,469 A | * | 8/1998 | Gerigk ........................ 180/441 |
| 6,371,236 B1 | * | 4/2002 | Fukunaga .................... 180/219 |
| 6,471,229 B2 | * | 10/2002 | Stewart ....................... 280/272 |

FOREIGN PATENT DOCUMENTS

| | | |
|---|---|---|
| DE | 2710651 A1 | 9/1978 |
| EP | 0900722 A2 | 3/1999 |
| EP | 0900722 A3 | 3/1999 |
| JP | 63-64888 | 3/1988 |
| JP | 7-74023 | 8/1995 |
| JP | 2593461 | 12/1996 |

* cited by examiner

*Primary Examiner*—Lesley D. Morris
*Assistant Examiner*—Tony Winner
(74) *Attorney, Agent, or Firm*—Birch, Stewart, Kolasch & Birch, LLP

(57) ABSTRACT

A steering damper system for motorcycles provided for generating an adjustable damping force for restraining the shaking of the steering system at the time of disturbance. The system includes a cross member laid between the front portions of the mainframes branching to the left and right from the head pipe and extending to the rear, and a steering damper mounted at the center of the cross member. A sector gear projects forward from the housing, and the teeth thereof are inserted through the opening formed on the head pipe, and are engaged with the drive gear integrally mounted around the steering stem rotatably supported within the head pipe. The resulting steering damper provides the desired adjustable damping force without adversely increasing the inertia of the steering system.

23 Claims, 5 Drawing Sheets

STEERING DAMPER SYSTEM FOR VEHICLES

CROSS-REFERENCE TO RELATED APPLICATIONS

The present application claims priority under 35 U.S.C. §119 to Japanese Patent Application No. 2001-157068, filed on May 25, 2001, the entire contents thereof are hereby incorporated by reference.

BACKGROUND OF THE INVENTION

1. Field of the Invention

The present invention relates to a steering damper system for motorcycles provided for generating a damping force to restrain shaking of the steering system at the time of disturbance, and more specifically, to a steering damper system in which a damping force is adjustable.

2. Description of Background Art

A steering damper system which generates a damping force to prevent shaking of the steering system caused by kickback, or the like, at the time of disturbance, is known (for example, U.S. Pat. No. 2593461). A steering damper system in which a damping force is adjustable so as to generate a precise damping force, and a system in which a damping force is generated only when needed, are also known. For example, there is the system that controls the damping force based on the steering angle and the traveling speed (Japanese Patent Laid-Open No.64888/1988). There is another system that controls the damping force based on the variation of the load exerted on the front wheel (Japanese Patent Publication No.74023/1995).

The steering damper of the aforementioned related art is relatively heavy. When it is disposed in the steering system, inertia increases at the time when the vehicle is turned by an amount corresponding to the weight of the steering damper added thereto. However, in a steering system, it is desirable to prevent this increase in inertia, and thus provide a steering system that has the same inertia as those without a steering damper. Further, it is desirable to provide an installation structure for the damper that does not impair the appearance of the vehicle body while maintaining enough operating space for the damper needed for the steering operation. Also, since it may be difficult to do maintenance on a steering damper if mounted in a tight space, it is also desirable that the structure for the steering damper be such that maintenance can be done easily.

SUMMARY AND OBJECTS OF THE INVENTION

The object of the present invention is to realize the requirements outlined above. Accordingly, the present invention relates to a steering damper system for vehicles and includes a pair of left and right mainframes branching to the left and right from the head pipe located at the front end and extending rearward along the vehicle body. It includes a steering system f or steering a front wheel rotatably supported on the head pipe and a steering damper for providing a damping force to the steering system. The p air of left and right mainframes are connected by a cross member in the vicinity of the head pipe, the steering damper is disposed on the cross member, and the operating section of the steering damper and the steering system are connected by a connecting member.

According to a second aspect of the steering damper system of the present invention, the cross member is detachably secured on the pair of left and right mainframes.

According to a third aspect of the steering damper system of the present invention, the cross member is secured on or under the pair of left and right mainframes.

The steering damper is installed in the vicinity of head pipe by connecting the pair of left and right mainframes by a cross member in the vicinity of the head pipe. A damping force may be generated by the steering damper when the vehicle is turned. The steering damper is disposed on the cross member via the connecting member. Therefore, inertia occurring at the time of steering may be maintained at the same level as in conventional steering systems not having a damper. This is due to the fact that, even though the steering damper is a heavy part, it does not have to be disposed in the steering system. With this invention, a good vehicle appearance is maintained, because the damper is disposed in a space between the left and right mainframes.

Also, according to the present invention, the cross member and the steering damper may be removed easily and at the same time, because the cross member is detachably secured on the pair of left and right mainframes. Therefore, since maintenance work need not be done in a small space, maintenance of the steering damper is facilitated.

Further, according to the present invention, the cross member is secured on or under the pair of left and right mainframes. Thus, the steering damper and the cross member may be attached and detached from above or from below the vehicle body, further facilitating maintenance of the steering damper.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
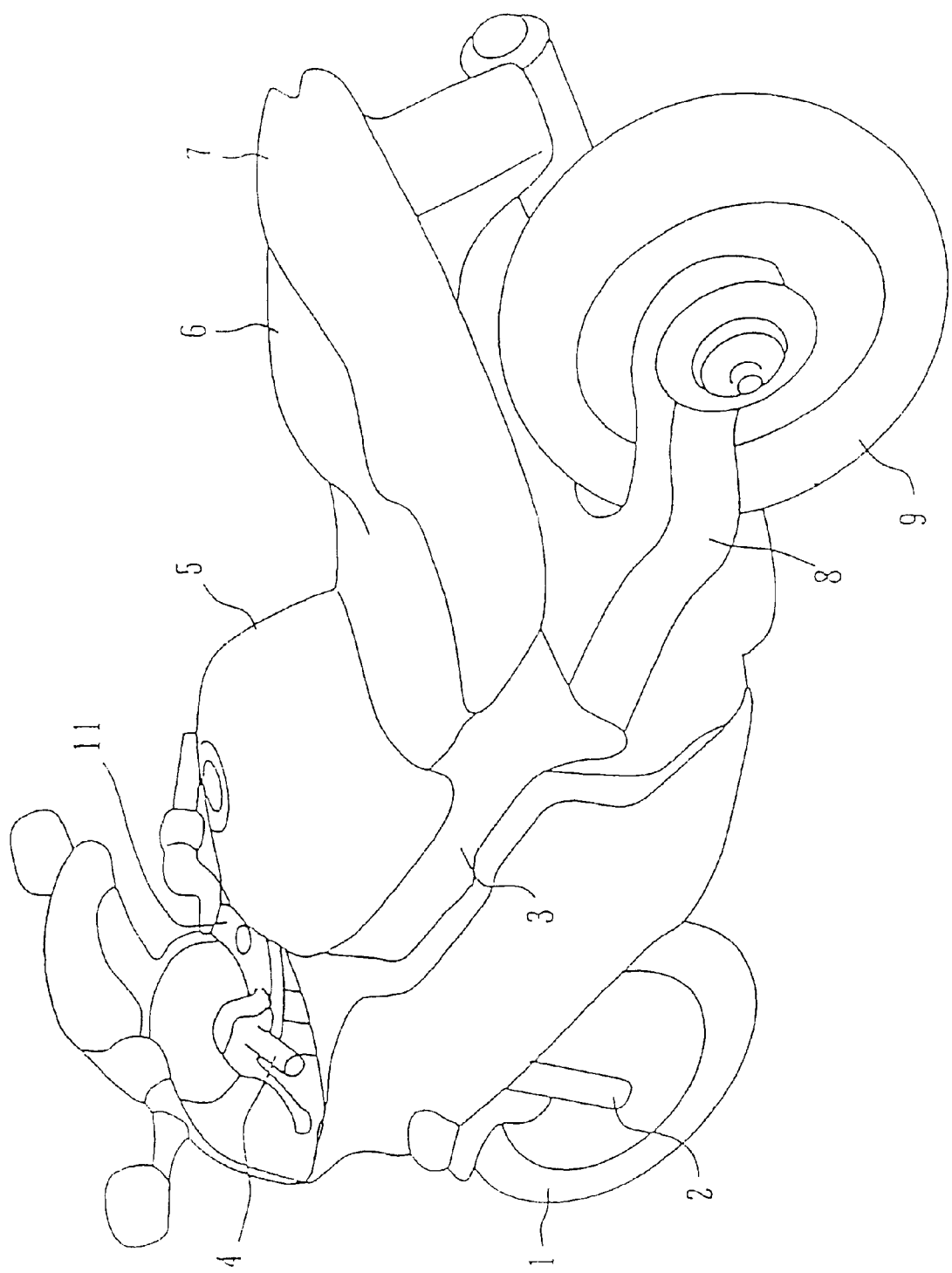
FIG. 1 is a schematic perspective view of the motorcycle to which the present invention is applied.
Figure 2:
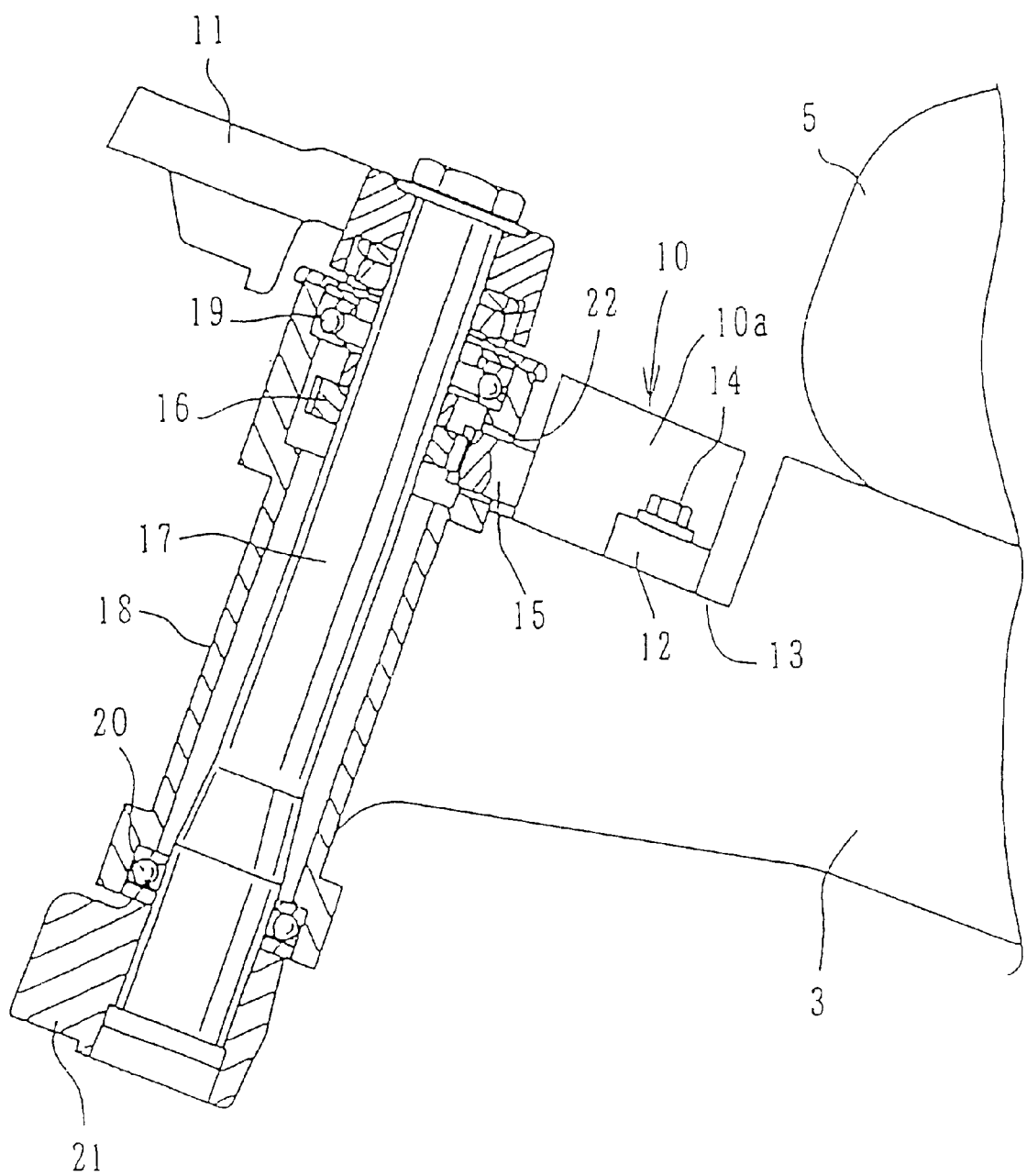
FIG. 2 is a partially exploded side view of the front portion of the vehicle body according to the present invention.
Figure 3:
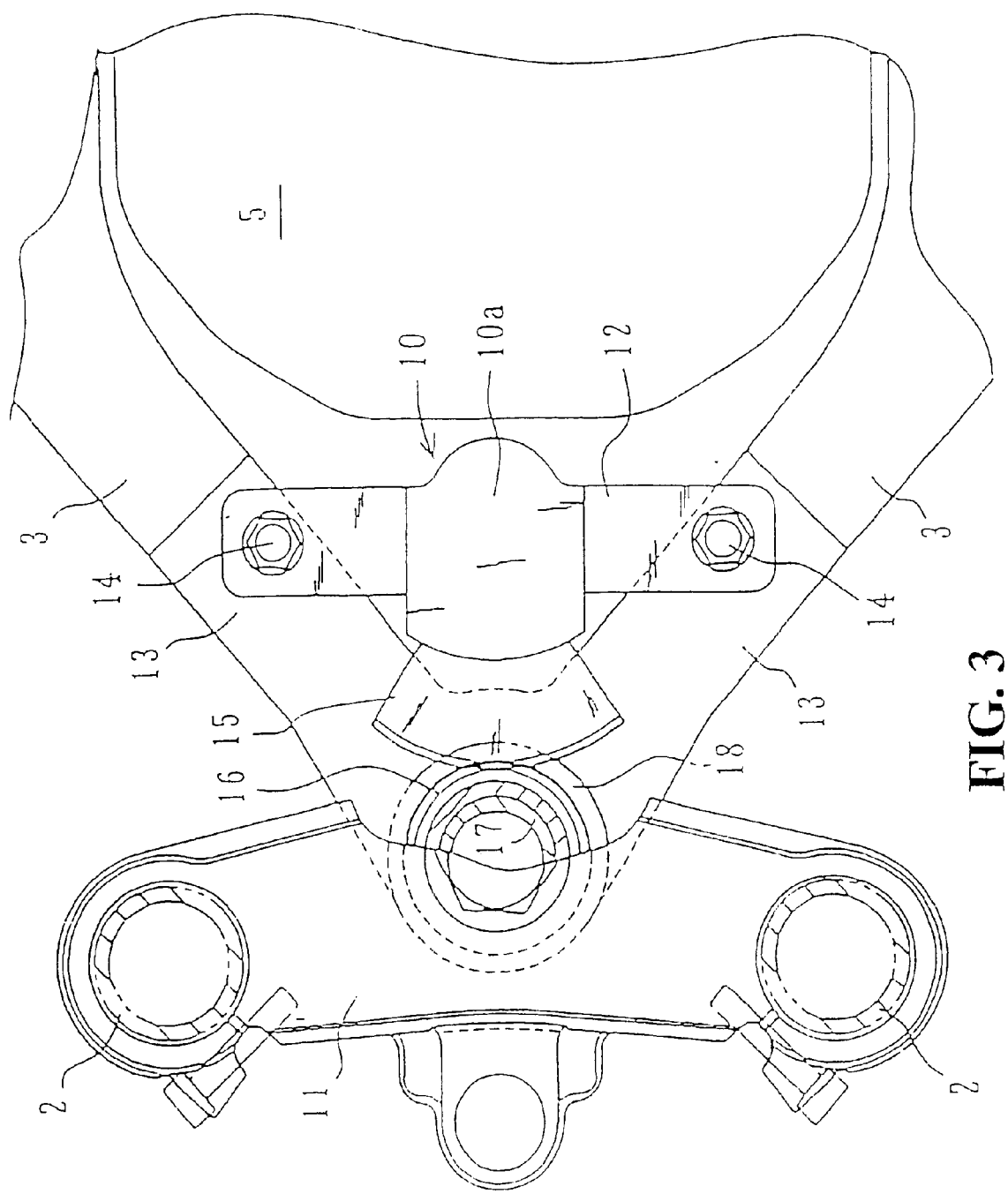
FIG. 3 is a plan view of the same part.
Figure 4:
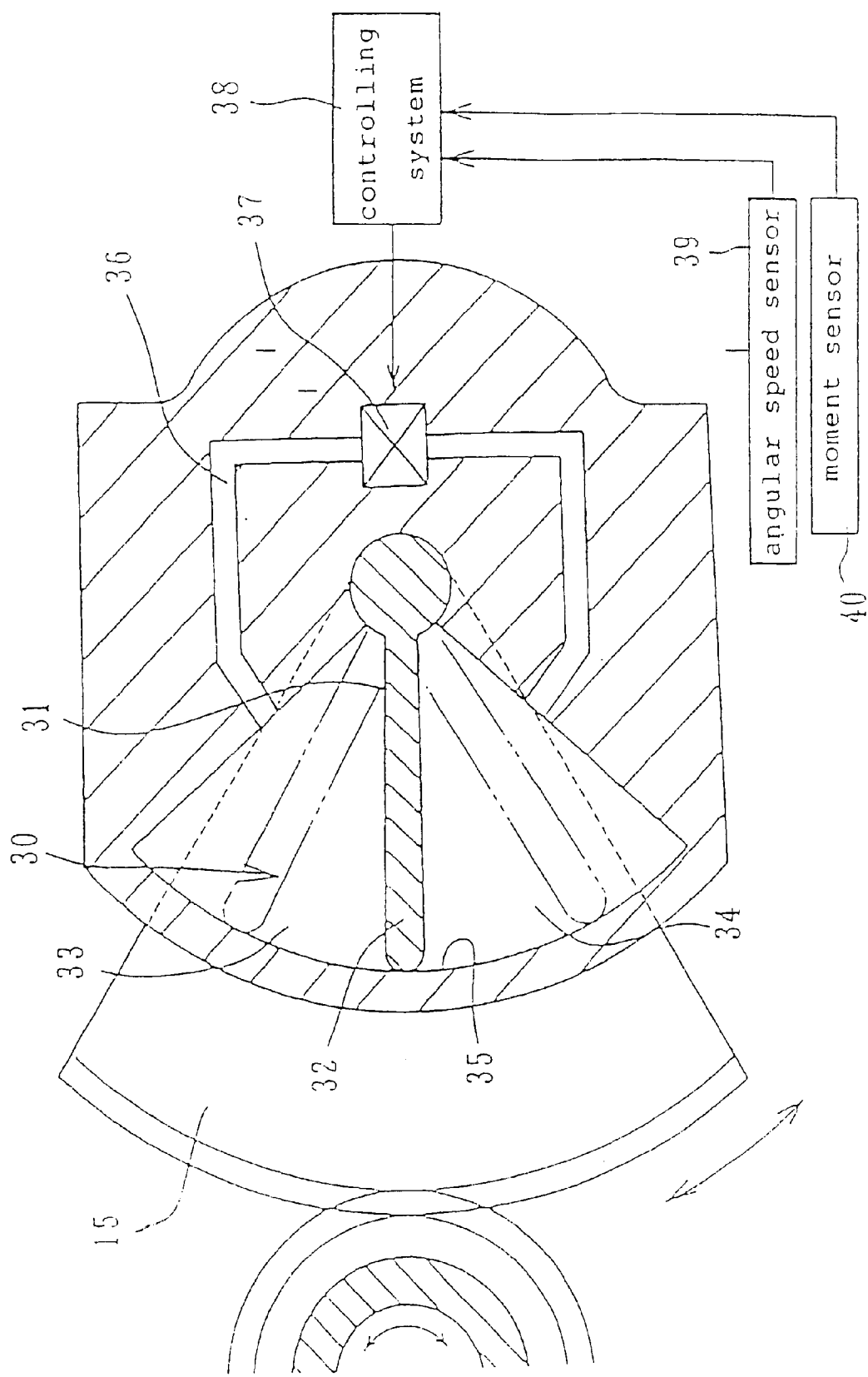
FIG. 4 is a drawing showing a schematic structure of the steering damper.
Figure 5:
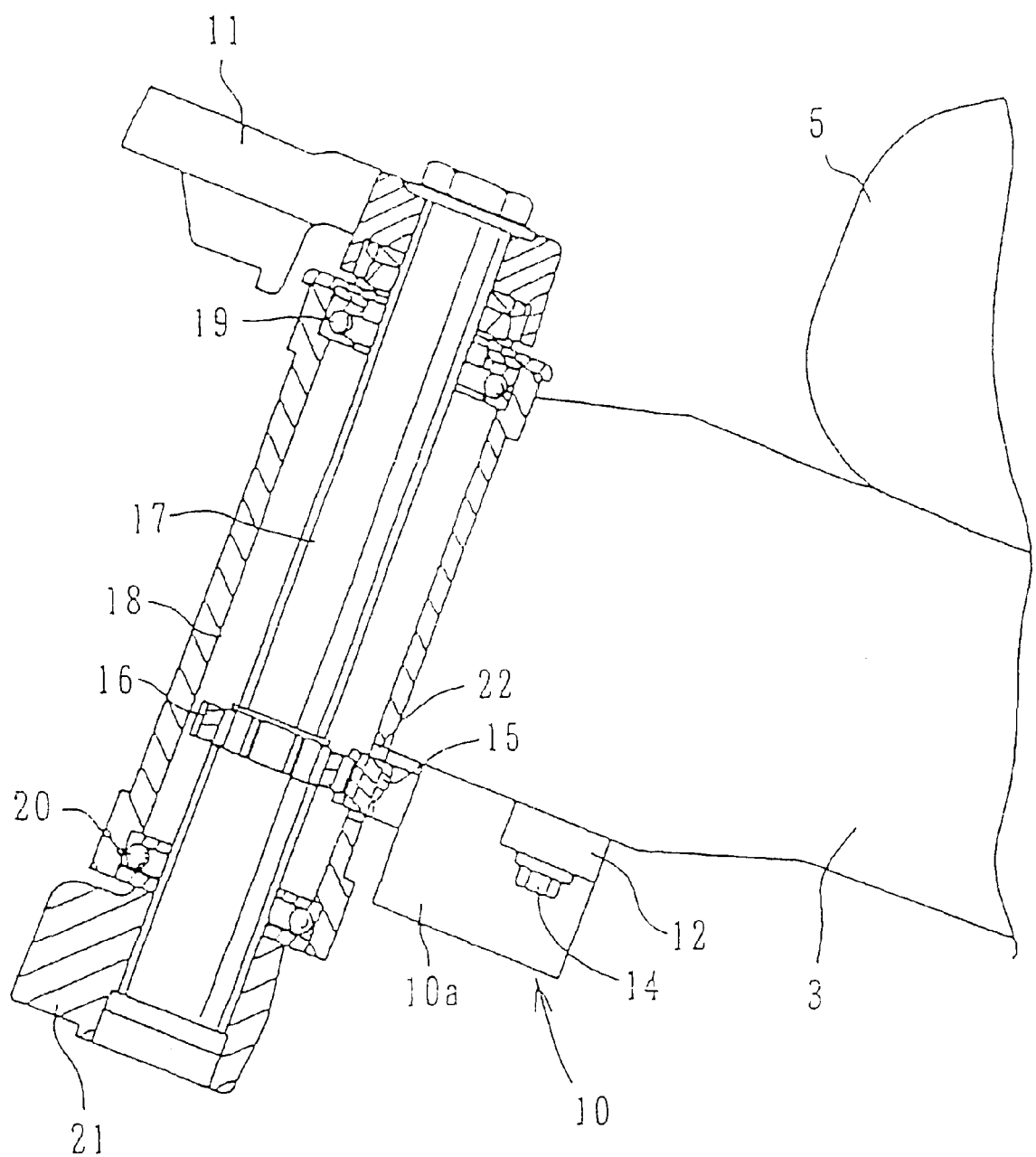
FIG. 5 is a drawing of the second embodiment corresponding to FIG. 2.

Referring now to the drawings, the first embodiment will be described. FIG. 1 is a schematic perspective view of the motorcycle to which the present invention is applied; FIG. 2 is a partially exploded side view of the front portion of the vehicle body; FIG. 3 is a plan view of the same part; and FIG. 4 is a drawing showing a schematic structure of the steering damper.

In FIG. 1, the upper portion of a front fork 2 supporting a front wheel 1 at the lower end thereof is connected to the front portion of a vehicle body frame 3, and is rotatable by a handle 4. A fuel tank 5 is supported on the vehicle body frame 3. Shown also are a seat 6, rear cowl 7, a rear swing arm 8, and a rear wheel 9.

The steering damper will be described below. As shown in FIGS. 2 and 3, the steering damper 10 is disposed at the central portion of a cross member 12 laid between the front portions of the mainframes 3, 3. Mainframes 3, 3 branch to the left and right in the vicinity of the upper bracket 11 on which the handle (not shown) is mounted.

In this embodiment, a housing 10a for accommodating the operating portion of the steering damper 10 and the cross member 12 are integrally formed of cast metal, or the like. The cross member 12 is formed into a plate shape laterally extending from the housing 10a, and the respective ends of the extended portion are secured to the stepped recesses 13 formed on the upper portion of the mainframe 3 with bolts 14 from above the vehicle body. The cross member 12 also serves as a reinforcing member at the front portion of the mainframe 3.

At the front portion of the steering damper 10, a sector gear 15 projects from the housing 10a forwardly of the vehicle body, and engages with the drive gear 16. The drive gear 16 is integrally mounted around the upper portion of a steering stem 17. Steering stem 17 passes through the head pipe 18 in the vertical direction, and is rotatably supported by the bearings 19, 20 at the top and bottom of the head pipe 18.

The upper and lower ends of the steering stem 17 is secured to the upper bracket 11 and the lower bracket 21 located at the upper and lower ends of the head pipe 18. The lower bracket 21 is placed substantially in parallel with the upper bracket 11, and supports the front fork 2 together with the upper bracket 11.

Therefore, the handle 4, the upper bracket 11, the steering stem 17, the lower bracket 21, and the front fork 2 constitute a steering system. When the handle 4 is turned, the upper bracket 11, the steering stem 17, the lower bracket 21 and the front fork 2 turn integrally to steer the front wheel 1. During the turning operation, the drive gear 16 also turns integrally with the steering stem 17.

The head pipe 18 is a tubular member connecting the front end portions of the left and right mainframes 3, 3 with each other to constitute the front end portion of the vehicle body frame. The head pipe is formed with an opening 22 at the location corresponding to the drive gear 16, through which the teeth of the sector gear 15 inserted into the head pipe 18 engage the drive gear 16.

FIG. 4 illustrates a structure of the steering damper 10 schematically, showing that a fan-shaped liquid chamber 30 fanning out toward the front is provided within the steering damper 10. Also shown is a shaft 31, rotatably provided at the position corresponding to the linchpin of the fan. The portion of the sector gear 15 located within the housing 10a corresponding to the linchpin of the fan is connected to the shaft 31, so that the sector gear 15 and the shaft 31 rotate as a single unit. The shaft 31 is also provided integrally with a wing-shaped portion 32 extending forward for dividing the liquid chamber 30. The liquid chamber 30 is thus divided into two chambers, the right liquid chamber 33 and the left liquid chamber 34.

The tip of the wing-shaped portion 32 is formed with a sliding surface, and is brought into sliding contact with the inner surface of the arc-shaped wall 35 of the liquid chamber 30. The right liquid chamber 33 and the left liquid chamber 34 are filled with uncompressible liquid such as oil, or the like, and are connected by a bypass channel 36. An adjustable valve 37 is provided at the central portion of the bypass channel 36. The adjustable valve 37 comprises a throttling passage for generating a damping force, and throttle may be varied by changing the sectional area of the throttling passage. However, the adjustable valve 37 employed here is not limited to the type described above. Alternatively, various other known adjustable valves may be employed.

By constructing the steering damper system comprising the steering damper 10 in the manner described above, when the steering stem 17 is turned, the drive gear 16 turns the sector gear 15 and the integrally connected shaft 31. As a consequence, the wing-shaped portion 32, which is integrally connected to shaft 31, is turned in the liquid chamber 30. The winged-shaped portion 32 moves (as shown in phantom) to vary the volume balance between the right liquid chamber 33 and the left liquid chamber 34. Liquid moves the by-pass channel 36 in accordance with variations in volume balance.

Accordingly, when the prescribed conditions are met, such as may be caused by a disturbance or the like, the adjustable valve 37 is throttled. The movement of liquid in the by-pass channel 36 generates a damping force and restrains turning of the shaft 31, and further restrains turning of steering stem 17 via the sector gear 15 and the drive gear 16, thereby controlling the turning operation of the vehicle against adverse disturbances. Under normal conditions, the adjustable valve 37 is not throttled, thus enabling free movement of liquid in the by-pass channel 36 and smooth turning.

Throttling of the adjustable valve 37 is controlled by a controlling system 38. The controlling system 38 is constructed of a microcomputer, or the like. In this embodiment, it controls throttling of the adjustable valve 37 based on the detected signals of the angular speed sensor 39 and a moment sensor 40. In other words, the value of the angular speed and the rotated direction of the steering stem 17 are obtained by the angular speed detected by the angular speed sensor 39, and the direction of rotating torque applied on the steering stem 17 from the moment detected by the moment sensor 40 is detected. When these values meet the prescribed conditions, the throttle of the adjustable valve 37 is varied to adjust the damping force, thus controlling turning of the steering system 17 when kickback or another disturbance occurs. However, the elements employed by the controlling system 38 are not limited to those described above. Various known elements such as a speed of travel or a load on the front wheel may be employed as alternatives or in addition to the elements described above.

The operation of this embodiment will now be described. As is clear in FIGS. 2 and 3, the steering damper 10 is located at the midsection of the cross member 12 provided between the left and right mainframe 3, 3. Further, it is disposed outside the steering system, and not within or combined with the steering system. Therefore, when mounting the steering damper 10, the only changes that must be made to the steering system are that of providing a drive gear 16 around the steering stem 17, and forming an opening 22 on the head pipe 18.

Therefore, even when the steering damper 10 is mounted, only a small amount of weight is added as compared to the steering systems of the related art. Therefore, since inertia of the steering system changes little even when the steering damper 10 is mounted, the steering system of the present invention operates with the essentially same inertia conditions as conventional steering systems having no steering damper mounted thereon.

In order to perform maintenance of steering damper 10, the cross member 12 must simply be detached from the mainframes 3, 3 by removing the bolts 14. Thus, the steering damper 10 and the cross member 12 can be removed together, allowing maintenance to be performed separately from the vehicle body. Therefore, since maintaining the damper in a small space is unnecessary, the maintainability is improved.

In addition, the cross member 10 is secured on the pair of left and right mainframes 3, 3, and the steering damper 10 and the cross member 12 may be attached and detached from above the vehicle body. This further facilitates maintenance of the steering damper 10.

The second embodiment will now be described. In this embodiment, the mounting position of the steering damper 10 is inverted upside down, but otherwise is the same as the former embodiment. The common parts are only shown by identical numerals, and will not be described below. FIG. 6 is a drawing corresponding to FIG. 2, in which the cross member 12 is mounted on the lower surfaces of the left and right mainframes 3, 3 from below the vehicle body, and the steering damper 10 is mounted on the cross member 12. Therefore, the drive gear 16 and the opening 22 are provided on the lower position of the steering stem 17 and the head pipe 18 respectively.

In this arrangement, since the space below the front portion of the mainframe 3 may be effectively utilized, the space behind the head pipe 18 increases. Also, the steering damper 10 and the cross member 12 may be attached and detached from below the vehicle body, thereby facilitating maintenance of the steering damper 10 as in the case of the former embodiment. In addition, since the steering damper 10 cannot be seen from above, a good appearance may be maintained.

The present invention is not limited to the embodiments described so far, and various modifications or applications may be made within the principle of the same invention. -For example, it is also possible to provide the housing 10a of the steering damper 10 and the cross member 12 separately and mount the housing 10a detachably to the cross member 12 with bolts, or the like. In this case, when performing maintenance of the steering damper 10, either it may be removed together with the cross member 12 from the mainframe 3 as in the former embodiment, or only the steering damper 10 may be attached or detached for maintenance without detaching the cross member 12.

Though the steering damper 10 and the steering stem 17 are connected by the sector gear 15 and the drive gear 16 in the aforementioned embodiments, the invention is not limited thereto. Turning of the steering stem 17 may be transmitted to the steering damper by any appropriate means, such as a link structure, or a lever structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A steering damper system for a vehicle having a pair of left and right mainframes branching left and right from a head pipe located at a front end and extending rearward along a vehicle body, and a steering system for steering a front wheel rotatably supported on the head pipe, said steering damper system comprising:
    a cross member detachably secured to the left and right mainframes in the vicinity of the head pipe;
    a steering damper disposed on the cross member; and
    an operating section of the steering damper and the steering system are connected by a connecting member.

2. The steering damper system for vehicles according to claim 1, wherein the cross member is detachably secured on upper sides of the left and right mainframes.

3. The steering damper system for vehicles according to claim 1, wherein the cross member is secured on lower sides of the left and right mainframes.

4. The steering damper system for vehicles according to claim 3, further comprising:
    a control device for controlling an adjustable valve provided in a bypass channel connecting two sides of a liquid chamber of the steering damper;
    a angular speed sensor; and
    a moment sensor,
    wherein the control device controls said adjustable valve for generating a damping force of the steering damper for controlling turning of the vehicle in response to sensing signals from each of said sensors.

5. The steering damper system for vehicles according to claim 4, wherein the adjustable valve changes a sectional area of the bypass channel.

6. The steering damper system for vehicles according to claim 4, wherein the liquid chamber is fan-shaped, and a shaft with a winged-shaped portion is provided extending forward for dividing an inside of the liquid chamber into the two sides which are connected by the bypass channel.

7. The steering damper system for vehicles according to claim 1, further comprising a sector gear projecting forward from the steering damper, and teeth thereof are inserted through an opening formed on the head pipe, and are engaged with a drive gear integrally mounted around a steering stem rotatably supported within the head pipe.

8. The steering damper system for vehicles according to claim 2, wherein the cross member is detachably secured to said left and right mainframes with bolts for permitting easy removal of the cross member and the steering damper.

9. A steering damper system for a vehicle comprising:
    a head pipe located at a front of the vehicle;
    a pair of left and right mainframes branching left and right from the head pipe and extending rearward along a vehicle body;
    a cross member connecting said left and right mainframes in the vicinity of the head pipe; and
    a steering damper disposed on the cross member,
    wherein the steering damper is separate from the head pipe and an operating section of the steering damper and the head pipe are connected by a connecting member.

10. The steering damper system for vehicles according to claim 9, wherein the cross member is detachably secured on upper sides of the left and right mainframes.

11. The steering damper system for vehicles according to claim 9, wherein the cross member is secured on lower sides of the left and right mainframes.

12. The steering damper system for vehicles according to claim 11, further comprising:
    a control device for controlling an adjustable valve provided in a bypass channel connecting two sides of a liquid chamber;
    a angular speed sensor; and
    a moment sensor,
    wherein the control device controls said adjustable valve for generating a damping force of the steering damper for controlling turning of the vehicle in response to sensing signals from each of said sensors.

13. The steering damper system for vehicles according to claim 12, wherein the adjustable valve changes a sectional area of the bypass channel.

14. The steering damper system for vehicles according to claim 12, wherein the liquid chamber is fan-shaped, and a shaft with a winged-shaped portion is provided extending forward for dividing an inside of the liquid chamber into the two sides which are connected by the bypass channel.

15. The steering damper system for vehicles according to claim 9, further comprising a sector gear projecting forward from the steering damper, and teeth thereof are inserted through an opening formed on the head pipe, and are engaged with a drive gear integrally mounted around a steering stem rotatably supported within the head pipe.

16. The steering damper system for vehicles according to claim 10, wherein said cross member is detachably secured to said left and right mainframes with bolts for permitting easy removal of the cross member and the steering damper.

17. The steering damper system for applying an adjustable damper force to a steering system of a motorcycle, comprising:
- a pair of left and right mainframes branching to the left and right from a head pipe and extending rearward along a vehicle body;
- a cross member connecting said left and right mainframes in the vicinity of the head pipe; and
- a steering damper disposed on the cross member,
- wherein an operating section of the steering damper and a driving gear disposed around a steering stem of the steering system are connected by a connecting member.

18. The steering damper system for vehicles according to claim 17, wherein the cross member is detachably secured on upper sides of the left and right mainframes.

19. The steering damper system for vehicles according to claim 17, wherein the cross member is secured on lower sides of the left and right mainframes.

20. The steering damper system for vehicles according to claim 19, further comprising:
- a control device for controlling an adjustable valve provided in a bypass channel connecting two sides of a liquid chamber;
- a angular speed sensor; and
- a moment sensor,
- wherein the control device controls said adjustable valve for generating a damping force of the steering damper for controlling turning of the vehicle in response to sensing signals from each of said sensors.

21. The steering damper system for vehicles according to claim 20, wherein the adjustable valve changes a sectional area of the bypass channel.

22. The steering damper system for vehicles according to claim 20, wherein the liquid chamber is fan-shaped, and a shaft with a winged-shaped portion is provided extending forward for dividing an inside of the liquid chamber into the two sides which are connected by the bypass channel.

23. The steering damper system for vehicles according to claim 17, further comprising a sector gear projecting forward from the steering damper, and teeth thereof are inserted through an opening formed on the head pipe, and are engaged with the driving gear integrally mounted around the steering stem rotatably supported within the head pipe.

* * * * *